(12) United States Patent
Fogg et al.

(10) Patent No.: US 9,388,036 B2
(45) Date of Patent: Jul. 12, 2016

(54) CONTAINER RETAINING SYSTEM FOR A FILLER

(71) Applicant: Fogg Filler Company, Holland, MI (US)

(72) Inventors: Michael Fogg, Holland, MI (US); Larry Rillema, Zeeland, MI (US); Robert Dykema, North Muskegon, MI (US)

(73) Assignee: Fogg Filler Company, Holland, MI (US)

( * ) Notice: Subject to any disclaimer, the term of this patent is extended or adjusted under 35 U.S.C. 154(b) by 0 days.

(21) Appl. No.: 14/841,653

(22) Filed: Aug. 31, 2015

(65) Prior Publication Data

US 2016/0122176 A1  May 5, 2016

Related U.S. Application Data (63) Continuation-in-part of application No. 14/242,968, filed on Apr. 2, 2014, now Pat. No. 9,120,665.

(51) Int. Cl.
*B65B 7/28* (2006.01)
*B67D 7/84* (2010.01)
*F16M 13/00* (2006.01)

(52) U.S. Cl.
CPC . *B67D 7/84* (2013.01); *F16M 13/00* (2013.01)

(58) Field of Classification Search
CPC .................................. B67D 7/84; F16M 13/00
See application file for complete search history.

(56) References Cited

U.S. PATENT DOCUMENTS

| 2,462,375 | A  | * | 2/1949  | Flaherty  | A67F 5/08  |
|           |    |   |         |           | 211/75     |
| 5,778,633 | A  | * | 7/1998  | Sweeny    | B65B 43/60 |
|           |    |   |         |           | 53/201     |
| 8,590,277 | B2 | * | 11/2013 | Baroni    | B67B 3/2033|
|           |    |   |         |           | 53/300     |
| 8,622,469 | B2 | * | 1/2014  | Hogg      | B60R 11/00 |
|           |    |   |         |           | 248/313    |
| 2011/0089003 | A1 | * | 4/2011 | Fahldieck | B65G 29/00 |
|           |    |   |         |           | 198/803.1  |

* cited by examiner

*Primary Examiner* — Amy Sterling
(74) *Attorney, Agent, or Firm* — The Watson I.P. Group, PLC; Jovan N. Jovanovic; Vladan M. Vasiljevic (57) ABSTRACT

A container retaining system for a filler having an upstand portion, a container retaining assembly and a suspension assembly. The retaining assembly including a plate member having an upper surface and a lower surface. At least one opening extends through the plate member which is spaced apart from an outer portion extending outwardly sufficient so as to be capable of interfacing with a filler valve of a filler. The suspension assembly includes at least one strut tower. The strut tower extends through the at least one opening of the plate member. A biasing member biasing the plate member relative to the strut tower and the upstand portion in a first resting orientation. Overcoming the biasing member rotates the plate member relative to the upstand portion and the at least one strut tower. The plate member is configured to pivot relative to the strut tower into a deflected orientation.

9 Claims, 11 Drawing Sheets

CONTAINER RETAINING SYSTEM FOR A FILLER

CROSS-REFERENCE TO RELATED APPLICATION

The present application claims priority from U.S. patent application Ser. No. 14/242,968 entitled "Container Retaining System For A Filler", filed Apr. 2, 2014, the entire disclosure of which is hereby incorporated by reference in its entirety.

BACKGROUND OF THE DISCLOSURE

1. Field of the Disclosure

The invention relates in general to container filling equipment, and more particularly, to a container retaining system for retaining a container within a filler. It will be understood that the container retaining system is configured to retain a container during operation of the fill valve to fill the container (if such support is necessary), while allowing the fill valve to remain closed in the event that no container is present, and facilitating opening of the fill valve as desired for cleaning when no container is present.

2. Background Art

The filling of containers with fluid on filling equipment is well known in the art. Generally, fillers comprise rotary or linear fillers which include a number of container retaining assemblies which cooperate and interface with a plurality of filler valves. In many cases filler valves are located on a rotating spindle with a bowl containing the fluid to be filled. The containers are introduced into container retaining assemblies. Subsequently, the filler valves are introduced to the container within the container retaining assemblies. The filler valves are opened and the containers are filled.

Due to various cost and environmental concerns, containers for holding fluid have been redesigned to minimize the use of materials, typically, a polymer such as PET or the like. For example, the walls of the container have become increasingly thinner, and, consequently, more flexible. In addition, to accommodate newer smaller caps, the neck and spout of these containers has become shorter.

As a result of these changes, often times the container lacks the strength necessary to open a mechanical fill valve. Therefore, it has become necessary to support the container to a greater extent, or to alter the fill valve construction. For example, electric valves have been utilized in place of mechanical valves to facilitate the filling of these less rigid containers. Problematically, electric valves add immense complexity to the filler equipment and greatly reduce the robustness of the filler. In addition, the electric valves are not well suited for the filler environment, especially during cleaning steps. In particular, the pressure of the cleaning fluids and the very nature of the cleaning fluids often is very destructive to the valves.

While it is desirable to utilize mechanical valves, it has been heretofore difficult to utilize mechanical valves with such containers. In particular, where additional support is provided to the container (i.e., supporting the container at the neck), the additional support can interfere with the operation of the fill valve. This is especially true in situations where the filler valve is directed into a dispensing position, but a container has inadvertently not been properly positioned within the container retaining assembly. Undesirably, the result is that the fill valve opens and fluid is spilled onto the equipment until the fill valve is again closed. In many of these types of fillers, it is desirable to have a cleaning operation wherein the mechanical valves are opened by the container retaining assemblies when containers are not present to allow the release of cleaning fluid to all of the areas within the valve.

SUMMARY OF THE DISCLOSURE

The disclosure is directed to a container retaining system for a filler that includes an upstand portion, a container retaining assembly and a suspension assembly. The upstand portion extends in a generally upward direction from a surface upon which containers are positioned for filling. The container retaining assembly is coupled to the upstand portion and includes a plate member having an upper surface and a lower surface. At least one opening extends through the plate member which is spaced apart from an outer portion extending outward sufficient so as to be capable of interfacing with a filler valve of a filler. The suspension assembly includes at least one strut tower and a biasing member. The strut tower extends through the at least one opening of the plate member. The biasing member biases the plate member relative to the strut tower and the upstand portion in a first resting orientation. Overcoming the biasing member rotates the plate member relative to the upstand portion and the at least one strut tower. The plate member is configured to pivot relative to the strut tower into a deflected orientation.

In some configurations, in the first resting orientation, the biasing member is directed into the upstand portion and into overlying placement relative thereto. In the deflected orientation, the plate member is rotated about the upstand portion, with the strut tower defining a stop, precluding further rotation.

In some configurations, the strut tower comprises a substantially cylindrical configuration and includes a first portion and a second portion. The first and second portions being concentric with the first portion having a diameter smaller than the second portion, and with an axial flange extending therebetween. The axial flange includes at least one of an outer edge and an outer surface, in turn, defining the stop.

In some configurations, the biasing member is a spring that encircles the strut tower.

In some configurations, the spring encircles the at least one opening of the plate member in the resting orientation.

In some configurations, the outer portion of the plate member is oblique relative to an inner portion of the plate member.

In some configurations, the strut tower includes a bore extending therethrough, with a fastener extending through the bore and into the upstand member. The fastener couples the strut tower to the upstand member.

In some configurations, a washer is positioned between a head of the fastener and the strut tower. The washer defines a first end biasing member retaining structure. The first end of the biasing member abuts the washer.

In some configurations, a second washer is positioned to overlie the upper surface of the plate member and to encircle the at least one opening. The second washer defines a second end biasing member retaining structure. The second end of the biasing member abutting the washer.

BRIEF DESCRIPTION OF THE DRAWINGS

The disclosure will now be described with reference to the drawings wherein:

FIG. 1 of the drawings is a perspective view of a container retaining system of the present disclosure, for use in association with a filler which is configured to fill containers with a flowable material, such as a liquid, syrup or the like;

DETAILED DESCRIPTION OF THE DISCLOSURE

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1:
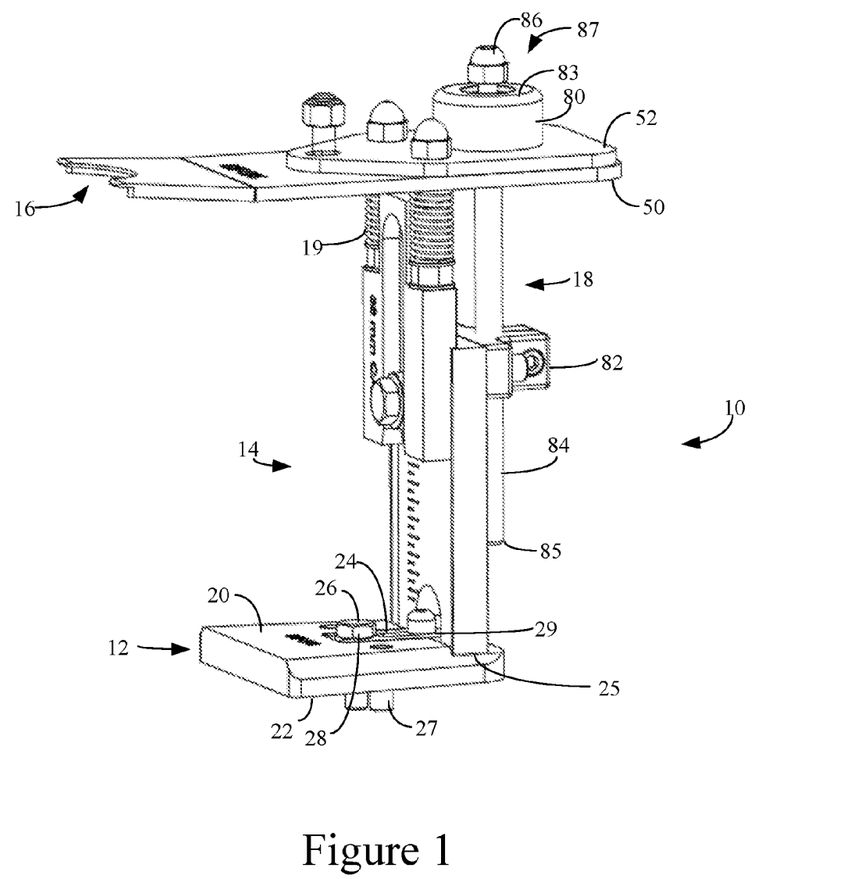

Referring now to the drawings and in particular to FIG. 1, the container retaining system for a filler is shown generally at 10. The container retaining assembly is configured for use on a filler, such as a rotary filler or the like, that is designed to fill generally rigid containers. It will be understood that such a filler may include dozens of valves and correspondingly dozens of such retaining assemblies (i.e., a retaining assembly for each one of the valves on the filler). Such fillers are known to those of skill in the art. The fill valves are likewise known in the art, and include such fill valves as that which is shown in U.S. Pat. No. 5,083,593 issued to Fogg, the entire specification of which is hereby incorporated by reference in its entirety. Of course, other fill valves are likewise contemplated for use.

Figure 7:
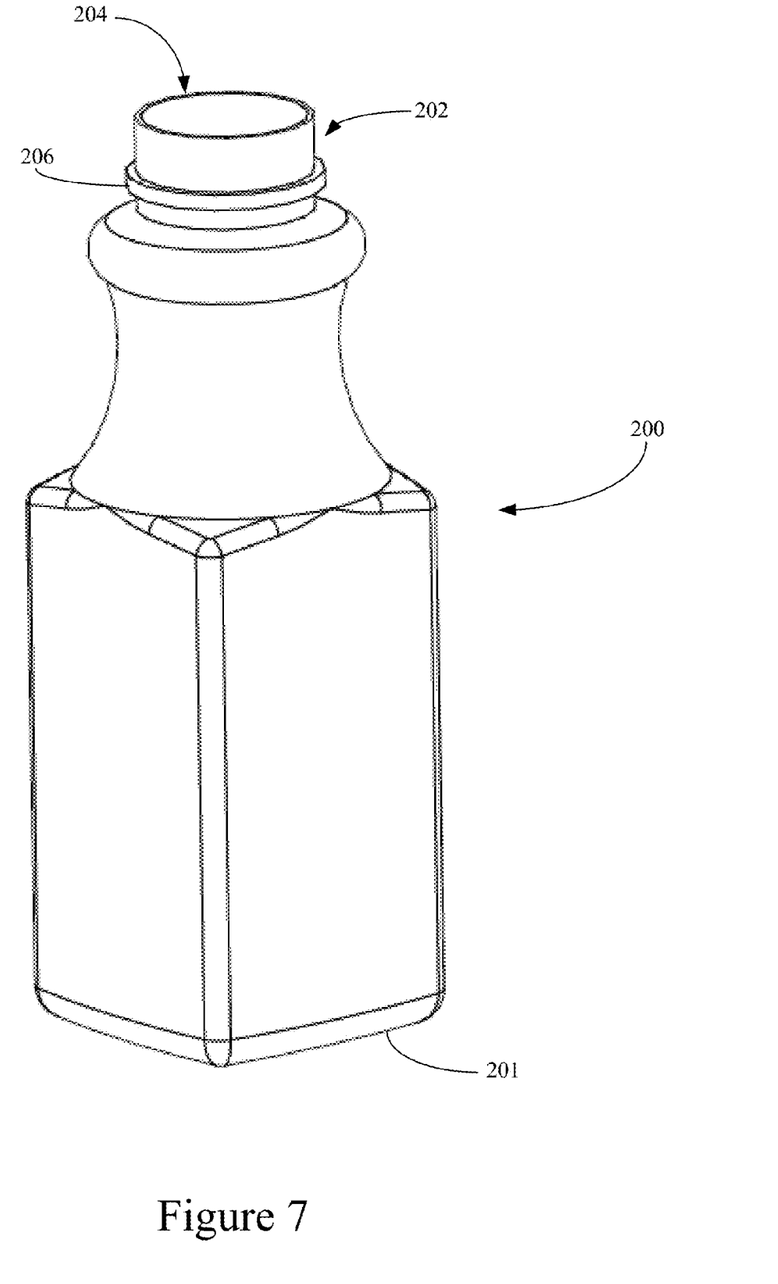
FIG. 7 of the drawings is a perspective view of an exemplary container with which the container retaining system is utilized, which container is to be indicative of an example of a container, and not to be limiting.

Generally, a typical container is retained and grasped by the container retaining assembly as shown in FIG. 7 generally at 200. Such a container includes base 201 and spout 202 with opening 204. The spout typically includes a flange 206 creating a space therebelow for receipt of the container grasping surface 63 (FIG. 5), as will be set forth below. Generally, these containers are formed from a polymer through a molding process (often blow molding, or the like). Often these containers comprise a PET material, or an HDPE material, although other materials are utilized, including but not limited to other polymers or glass or composites.

Referring again to FIG. 1, the container retaining system 10 is shown as including base 12, upstand portion 14, container retaining assembly 16, adjustment assembly 18 and suspension assembly 19. The base 12 includes top surface 20, bottom surface 22, slot 24 and locking assembly 26. The top surface includes rear ledge 25. The base 12 is coupled to the filler (often to the same chassis as other bases), through the locking assembly 26. In particular, the locking assembly includes fastener 28 and clip 29. The fastener extends through the clip 29, through the slot 24 and into the chassis (not shown). Locating pins 27 cooperate with openings on the chassis (not shown) so as to properly locate the base relative to the chassis, and preclude undesired relative movement therebetween.

Figure 2:
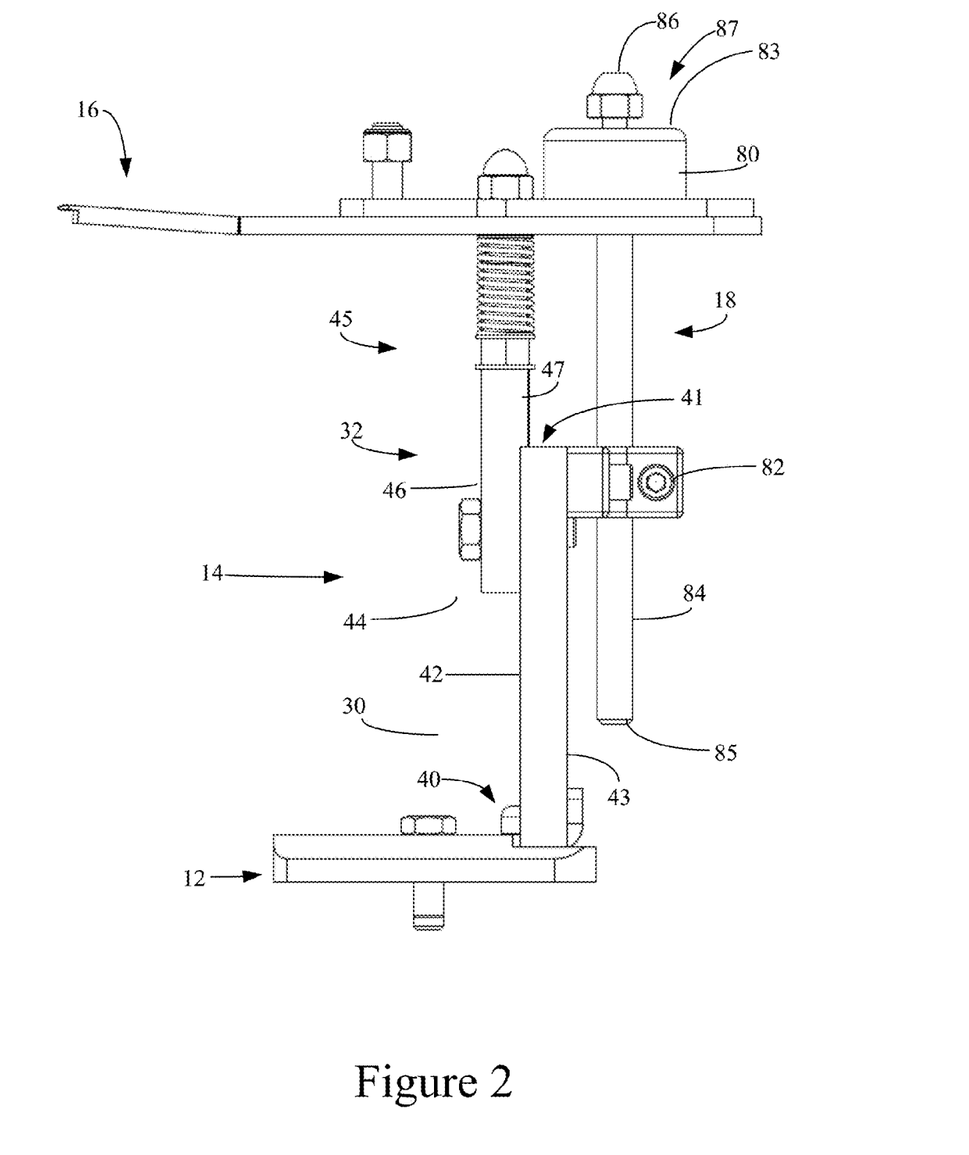
FIG. 2 of the drawings is a side elevational view of the container retaining system of the present disclosure.
Figure 3:
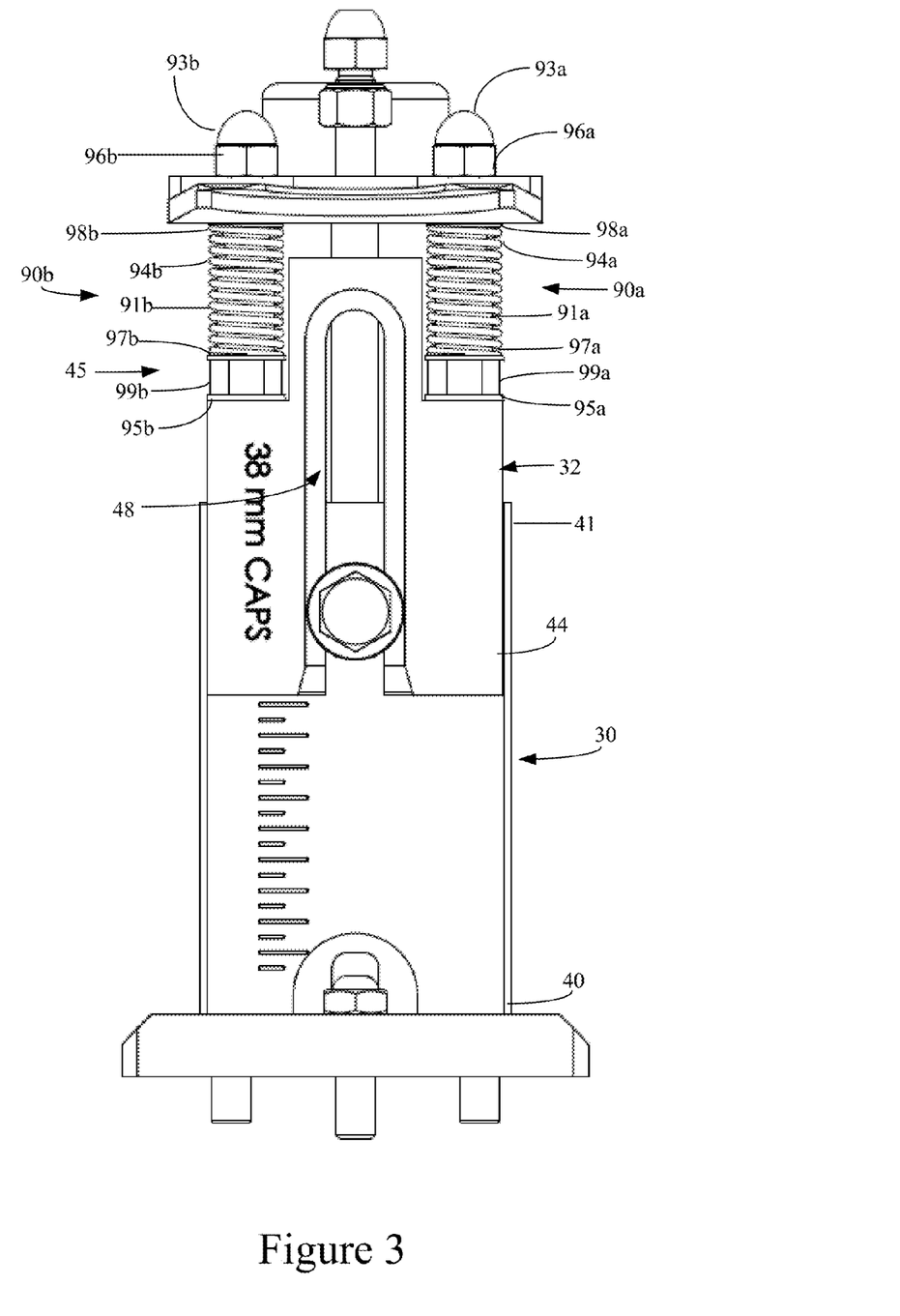
FIG. 3 of the drawings is a front elevational view of the container retaining system of the present disclosure.
Figure 4:
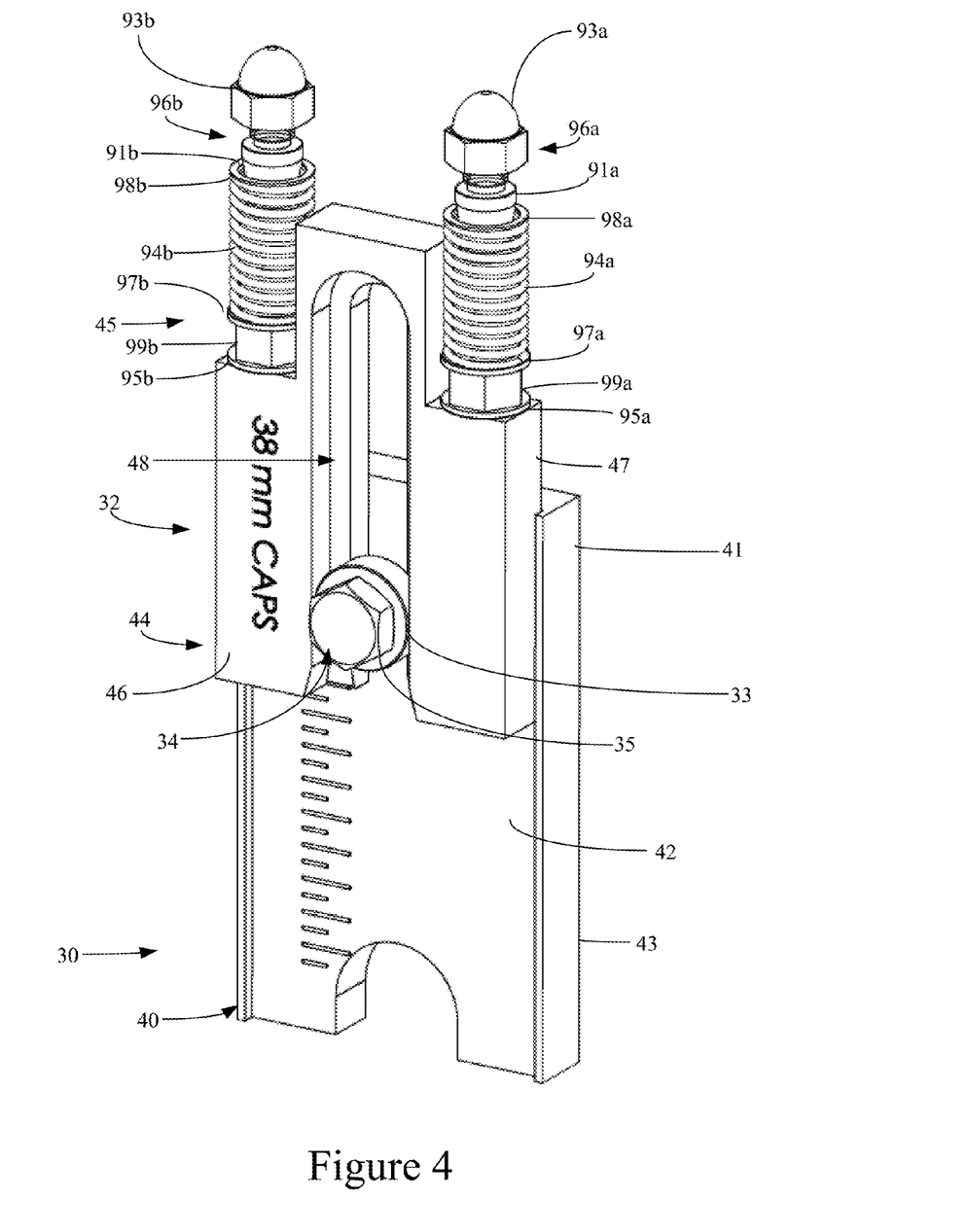
FIG. 4 of the drawings is a perspective view of a portion of the container retaining assembly of the present disclosure, showing, in particular, the upstand portion and the suspension assembly thereof.
Figure 8:
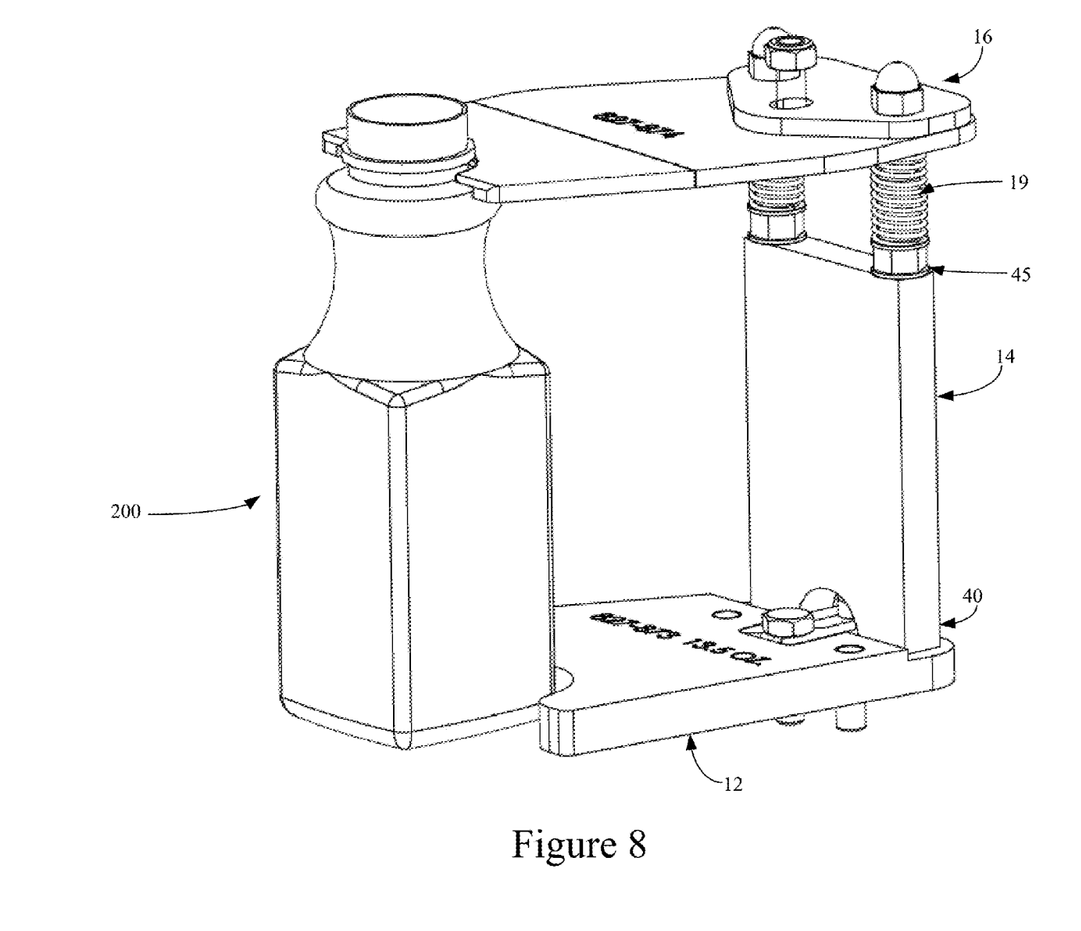
FIG. 8 of the drawings is a perspective view of another embodiment of the container retaining system of the present disclosure, showing an embodiment that has a single member for the upstand portion thereby removing the adjustability in the height of the upstand portion.

The upstand portion 14 is shown in FIGS. 2 through 4 as comprising lower mount 30, upper mount 32 and locking assembly 34. The upstand portion 14 is shown as comprising two relatively movable segments so as to effectively change the distance between the base and the container retaining assembly, thereby defining an effective height. It will be understood that the upper mount 32 and the lower mount 30 could be replaced with a single component, wherein the single upstand portion 14 is coupled to both the base at one end and the suspension assembly at the other end. One such embodiment is shown in FIG. 8. Such an embodiment has limited adjustability with respect to differently sized containers. In still other embodiments, the two components may be movable into a plurality of discrete positions, such as the embodiment of FIG. 9.

Referring again to FIGS. 2 through 4, the lower mount 30 includes proximal end 40, distal end 41, inner surface 42 and outer surface 43. The proximal end 40 is coupled to the base above the rear ledge 25 of the top surface 20. A notch is presented at the proximal end 40 so as to allow slidable movement of the clip 29 generally perpendicularly to the lower mount. The inner surface includes a measuring indicator portion as well as an opening to receive the fastener 35 of the locking assembly 34, as will be described below. While a number of different configurations are contemplated, the lower mount is substantially perpendicular to the base and the inner surface thereof includes a recessed portion configured to receive the upper mount 32, and to provide a guide therefor. Other configurations are likewise contemplated.

The upper mount 32 includes proximal end 44, distal end 45, inner surface 46 and outer surface 47. The distal end 45 generally defines the distal end of the upstand portion. A slot/cam surface 48 extends through the upper mount with an opening toward the proximal end 44 thereof. In the embodiment shown, the slot/cam extends substantially the entirety of the distance from the proximal end and the distal end. The upper mount is configured so that the outer surface of the upper mount 32 slidably moves over the outer surface 43 of the lower mount 30. As with the lower mount, the upper mount likewise comprises a generally rectangular cubic overall configuration (and with the slot, a configuration much like an inverted "U" shape).

The locking assembly 34 includes follower 33 and fastener 35. The locking assembly is configured to lock the lower mount 30 and the upper mount 32 in operable locked engagement. The follower engages with the slot while the fastener extends therethrough and into the opening of the inner surface 42 of the lower mount 30. Tightening of the fastener precludes relative movement of the two mounts.

Figures 5, 6:
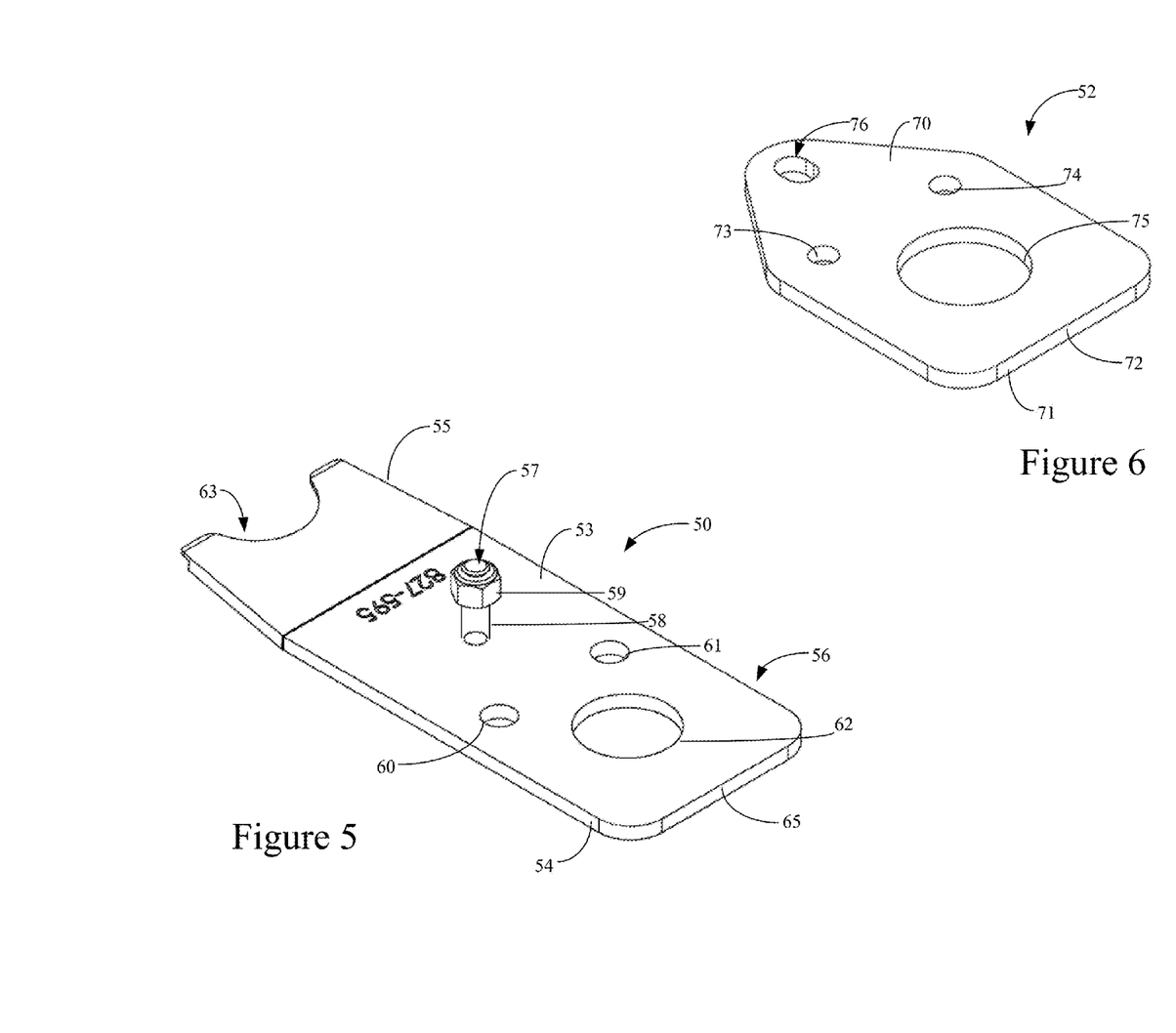
FIG. 5 of the drawings is a perspective view of the lower plate of the container retaining assembly of the present disclosure.
FIG. 6 of the drawings is a perspective view of the upper plate of the container retaining assembly of the present disclosure.

Referring now to FIGS. 1, 5 and 6, the container retaining assembly 16 includes lower plate 50 and upper plate 52. As will be explained, the two plates are positioned so that the upper plate overlies the lower plate in relative abutment, with the two plates being generally perpendicular (or oblique) to the upstand portion 14. As will be explained, the upper plate is fixedly coupled to the upper mount 32 and the lower mount 30 (through the adjustment assembly 18 and the suspension assembly 19) and generally precluded from relative movement therebetween.

With particular reference to FIG. 5, the lower plate 50 comprises upper surface 53 and lower surface 54 extending from an outer portion 55 to an inner portion 56. The outer portion 55 is angled obliquely relative to the inner portion 56. In the embodiment shown, the inner portion 56 is, in a resting position, substantially perpendicular to the upstand portion 14 and parallel with the base 12. The outer portion is angled upwardly as extending away from the inner portion. As will be explained below, such an angled configuration minimizes the wear of the lower plate and the filler valve upon contact therebetween.

The outer portion 55 includes, at its distal end, a container grasping surface 63. In the embodiment shown, the container grasping surface 63 generally has a shape that is mating to the portion of the spout below the flange explained above. Of course, a number of different configurations are contemplated, including embodiments where interface of the lower plate and the container is not required (i.e., where sturdy polymer containers, or, glass containers are utilized). The lower plate includes a centrally located stopper 57 on the inner portion 56 thereof. The stopper 57 comprises a post 58 (a portion of which is threaded) that extends upwardly from the lower plate, through the upper plate, and includes a fastener 59 threaded to a distal end of the post (other means other than threading are contemplated for positioning the fastener 59 at the end of the post, or another larger member that is larger than the opening in the upper plate through which the post extends).

On either side of the stopper and positioned between the stopper and the rear edge 65 of the inner portion, a first biasing member opening 60 and a second biasing member opening 61 is disposed. Generally, these openings are equidistantly spaced from the rear edge 65 of the inner portion and generally have the stopper positioned equidistantly therefrom so as to be symmetrical about a longitudinal axis of the lower plate extending generally midway between the sides thereof.

An adjustment opening is positioned between the biasing member openings 60, 61 and the rear edge 65, and is configured to allow the threaded fastener 84 to extend therethrough without impingement. In the embodiment shown, the adjustment opening is positioned generally along the longitudinal axis of the lower plate, as described above.

With more particular reference to FIG. 6, the upper plate includes upper surface 70 and lower surface 71, and defines rear edge 72. First biasing member opening 73 and second biasing member opening 74 extend through the upper plate and match the location of the first and second biasing member openings 60, 61 of the lower plate. Additionally, an adjustment assembly opening is provided which corresponds to the adjustment opening 62 of the lower plate.

As is shown in FIG. 1, the two plates are generally positioned in a stacked orientation with the rear edges generally matching (with the rear edge of the lower plate extending slightly beyond the rear edge of the upper plate), although such a configuration is not necessarily required. As will be understood, the upper plate is shorter than the lower plate, such that at least the outer portion of the lower plate extends beyond the upper plate. In the embodiment shown in FIG. 1, the inner portion of the lower plate 50 and the upper plate both include surfaces that are generally planar and generally which engage along virtually the entirety of the lower surface of the upper plate, although variations and different surface topographies are contemplated.

The adjustment assembly 18 is shown in FIGS. 1 and 2 as comprising upper mount 80, lower mount 82, threaded fastener 84 and adjustment nut 86. The adjustment assembly controls the vertical displacement and vertical orientation of the container retaining assembly 16 relative to the lower mount 30 of the upstand portion 14. That is, the upper mount 80 includes upper bushing 83. The threaded fastener includes first end 85 and second end 87. The threaded fastener is rotatably coupled at first end 85 to the upper mount and upper bushing 83. That is, the fastener is permitted to rotate relative to the upper plate, but the upper plate is configured to be coupled to the fastener so as to preclude slidable translation therebetween. The threaded fastener is threadedly engaged with the lower mount 82 which is spaced apart from the second end thereof. The adjustment nut 86 is positioned at the first end of the fastener and facilitates the rotative movement of the threaded fastener in either a clockwise or counterclockwise direction. It will be understood that as the threaded fastener is rotated in a first direction (by way of the adjustment nut 86), the threaded fastener is permitted to spin freely relative to the upper plate, but translates in a first direction relative to the lower mount. When rotated in a second direction, the translation is in a second direction relative to the lower mount 82. As such, by rotating the threaded fastener in a desired direction, the effective length of the upstand portion 14 (that is, the distance between the container retaining assembly 16 and the base 12 can be set as desired).

The suspension assembly 19 is shown in FIGS. 3 and 4 as comprising first strut assembly 90a and second strut assembly 90b. It will be understood that while the first and second strut assemblies may be differently configured, in the embodiment shown, the first and second strut assemblies are generally identical to each other in configuration and operation. It is also contemplated that a single strut may be utilized in place of the two struts (it is also contemplated that a greater number of struts may be utilized). It is further contemplated that another biasing member may be utilized to maintain the lower plate directed at the upper plate and so as to provide resistance to rotation (also known as a deflection) of the lower plate relative to the upper plate.

More specifically, the first strut assembly 90a comprises first strut tower 91a, first upper cap 93a and first biasing member 94a. The strut tower is coupled to the distal end of the upper mount 32 and extends generally vertically through the first biasing member opening 60 of the lower plate 50 and through the first biasing member opening 73 of the upper plate 52. At the lower end, the strut tower may be threaded and may extend into a correspondingly threaded opening on the upper mount. A lower nut 99a may be provided which locks the strut tower relative to the upper mount. The first upper cap 93a locks the strut tower to the upper plate 52. As such, the first strut tower (in combination with the second strut tower) fixes the upper mount 32 to the upper plate 52.

The first biasing member 94a comprises a spring having a first end 97a and a second end 98a. The first end 97a is proximate the lower nut 99a with the second end seating against the lower surface 54 of the lower plate 50 thereby pushing the lower plate against the upper plate. By altering the effective length of the first strut tower 91a, the length of the spring can be varied (or, stated another way, the resting spring force can be varied).

The second strut assembly 90b is generally identical to the first strut assembly 90a. The second strut assembly 90b is coupled to the distal end of the upper mount 32 on an opposite side from the first strut assembly 90a. The strut assembly generally extends vertically through the second biasing member opening 61 of the lower plate 50 and through the second biasing member opening 74 of the upper plate 52. At the lower end, the strut tower may be threaded and may extend into a correspondingly threaded opening on the upper mount. A lower nut 99b may be provided which locks the strut tower relative to the upper mount. The second upper cap 93b locks the strut tower to the upper plate 52. As such, the second strut tower likewise fixes the upper mount 32 to the upper plate 52.

As with the first biasing member 94a, the second biasing member 94b comprises a spring having a first end 97b and a second end 98b. The first end 97b is proximate the lower nut 99b with the second end seating against the lower surface 54 of the lower plate 50 thereby pushing the lower plate against the upper plate.

The operation of the container retaining system will be described with respect to a generally configured container, such as the container 200 of FIG. 7, (and not limited thereto) as well as with a typical filler valve (again, to which the container retaining system is not limited). Additionally, generally, the embodiment of FIGS. 1 through 6 will be described. Initially, the container is positioned on the chassis (or the base 12) and directed into position. In the embodiment shown in FIG. 7, the spout 202 is grasped below the flange 206 so that the container grasping surface 63 interfaces therewith and retains the same. One such configuration is shown in the embodiment of FIG. 8.

Referring again to the embodiment of FIGS. 1 through 6, once properly positioned, it will be understood that in the cycle, eventually the filler will drop down (or the chassis including the container retaining system will rise up) and the two will contact each other. Problematically, many of the current containers are generally made with increasingly less polymer, and, thus, they are weaker. In many instances, they lack the strength to defeat the spring on the filler and open the filler valve.

With the present container retaining system, when the filler hits the container, the container and the container retaining assembly act against the filler spring to open the valve. In particular, the force is transmitted through the lower plate 50 which is precluded from rotative movement relative to the upper plate by the first and second springs 94a, 94b. The combined resistance of the springs and the container rigidity is sufficient to overcome the spring of the valve and allow the valve to open. Once open, the valve fills the container to the desired level and then is closed and removed.

As the filler is filling containers, it is often the case that sequentially, a filler station (having a head and a corresponding container retaining assembly) may not receive a container. When a container is not presented at the time that a fill step is expected (or, a container is expected for filling), it is desirable not to have the filler valve open, but to allow the filler valve to move into position but not open, then move away (thereby not opening, but not causing a cessation of the equipment). That is, the cycle of the filler machine continues without either stopping or spilling fluid even where a container is not present.

In the instance where there is not a container, the filler valve nevertheless comes into position expecting a container. Instead, the filler valve hits the lower plate 50 at the outer portion 55 thereof. As the springs 94a, 94b are not of sufficient strength to overcome the spring keeping the fill valve closed, the continued movement of the fill valve overcomes the springs 94a, 94b and the lower plate 50 rotates relative to the upper plate sending the outer portion in a downward direction. As the valve reaches its lowest point, the lower plate stops rotating, and the valve remains closed. The valve (continues as if it was opened) moves away from the container retaining system 10 after a predetermined time (which would have substantially corresponded to the filling time) and the cycle repeats. Throughout the cycle, no adjustment was required to the container retaining assembly or the fill valve to preclude the dispensing of fluid from the fill valve due to no container being present. By angling the outer portion 55 of the lower plate relative to the inner portion 56, wear caused by the impact of the filler valve on the outer portion 55 can be minimized.

When it is necessary to clean the filler valves, typically, either the valves will travel through a longer stroke, or the container retaining system will be directed closer to the valve. In either case, when cleaning the filler valves, the filler valve is again directed into contact with the outer portion 55 of the lower plate. Again, in the same manner as explained above with respect to the situation wherein no container is present, the springs 94a, 94b are of insufficient strength to overcome the biasing force keeping the fill valve closed. As such, the valve remains closed. However, continued downward movement of the fill valve relative to the container retaining system (which is accomplished by downward movement of the fill valve, or upward movement of the container retaining system, or movement of both), eventually directs the stopper to preclude further rotative movement of the lower plate 50. That is, the fastener 59 of the stopper 57 hits the upper plate 52. As the fastener 59 is larger than the opening of the upper plate further movement of the two plates relative to each other is precluded. At such time, the lower plate 50 becomes essentially fixed, and continued downward force by the fill valve will open the fill valve.

Thus, the container retaining system allows for the continued operation of the filler whether or not a container is presented in a container retaining system that has a filler valve in a dispensing configuration, without dispensing any fluid through the fill valve. At the same time, the container retaining system allows for the opening of the fill valve during cleaning operations by limiting the movement of the lower plate relative to the upper plate and the base 12 to eventually stop moving and to provide the force necessary to open the fill valve.

It will be understood that the embodiment of FIG. 1 is likewise configured to adjust based upon the height of the container that is to be filled. In particular, the distance between the base 12 and the container retaining assembly can be changed. For example, to increase the distance, the user first releases the locking assembly 34 which selectively permits relative movement of the lower mount 30 relative to the upper mount 32. Once released, the user can rotate the threaded fastener 84 of the adjustment assembly in either a first direction or a second direction. In a first direction, the rotation of the threaded fastener translates the threaded fastener relative to the lower mount, slidably moving the lower mount 30 in a downward direction along the upper mount 32 toward the base 12. In a second direction, the rotation of the threaded fastener translates the threaded fastener relative to the lower mount, slidably moving the lower mount 30 in an upward direction along the upper mount 32 away from the base 12.

In either case, once a desired height is reached, the user can again reengage the locking assembly to preclude further movement. It will be understood that the lower mount may have a fastener so as to impart a force upon the threaded fastener to require a rotative force to overcome. In such a manner, inadvertent rotation of the threaded fastener is precluded. As such, the locking assembly could be omitted, or, where improperly tightened, the upper mount and the lower mount remain in position and generally do not move relative to each other.

Figure 9:
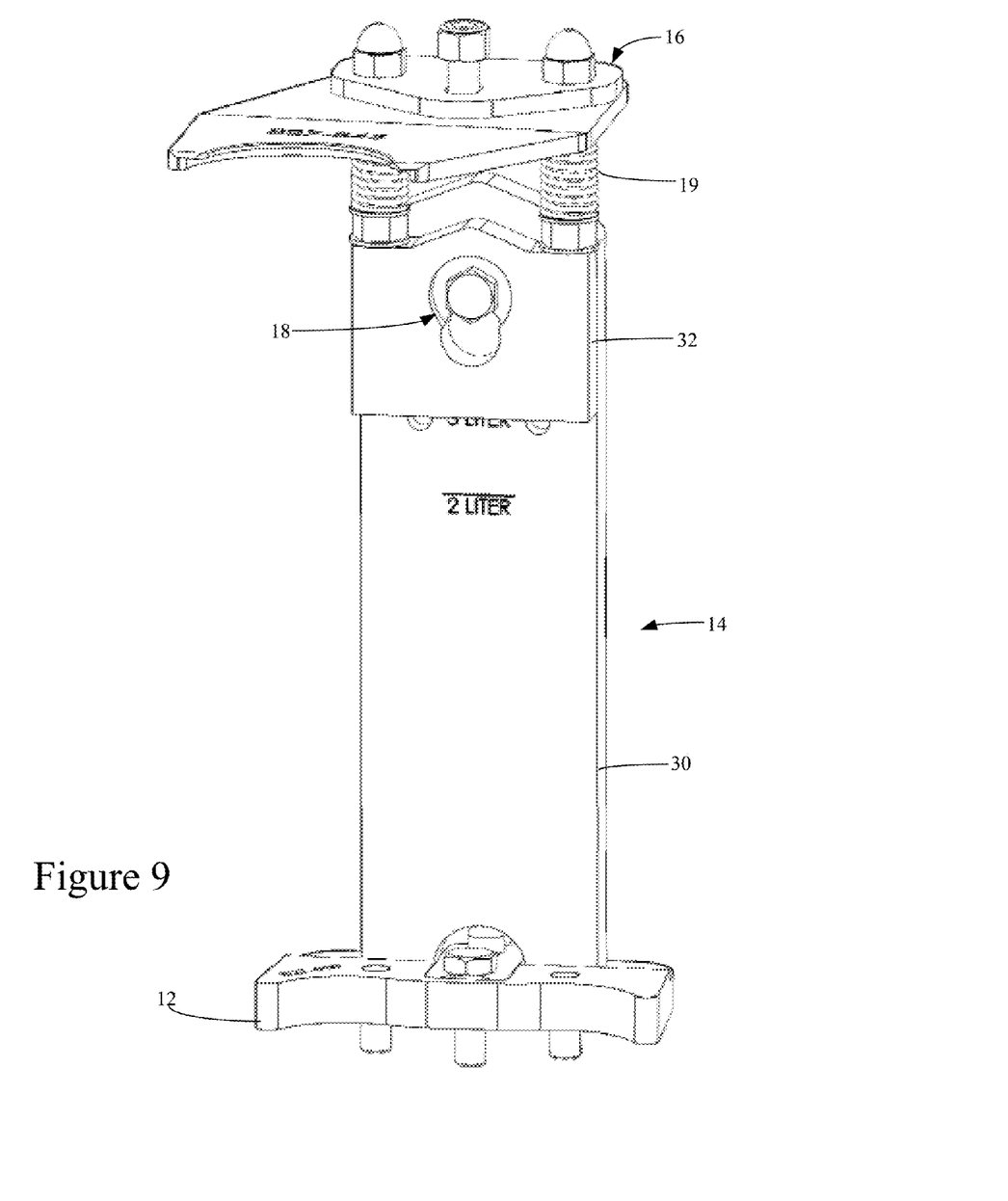
FIG. 9 of the drawings is a perspective view of another embodiment of the container retaining system of the present disclosure, showing an embodiment that has an upstand portion wherein the lower mount and the upper mount can be adjusted relative to each other in a plurality of discrete relative positions.

In the embodiment shown in FIGS. 1 through 6, within the range of movement of the lower mount 30 and the upper mount 32, the two are infinitely positionable with respect to each other. In the embodiment of FIG. 9, the upper mount is movable relative to the lower mount, but positionable in a plurality of discrete configurations. For example, the upper mount includes a plurality of pegs and the lower mount includes a plurality of openings. Different effective heights of the upstand portion can be achieved by placing the pegs in different combinations of openings in the lower mount. In the embodiment shown, there are three distinct positions that can be achieved through the three different sets of openings. Of course, in other embodiments, fewer or greater different combinations of positions is contemplated.

In still other embodiments, such as the embodiment of FIG. 8, the features of the upper mount and the lower mount can be unitized into a single upstand portion. In such a configuration, the base and the container retaining assembly remain in a relatively constant separation, and adjustment is very limited.

Figure 10:
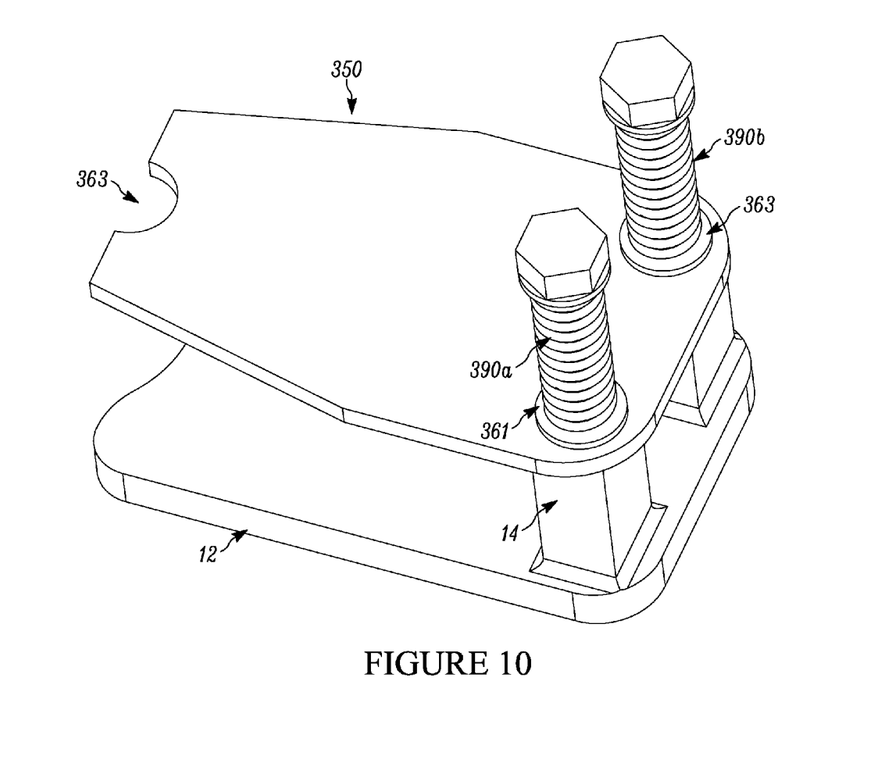
FIG. 10 of the drawings is a perspective view of another configuration of the container retaining system of the present disclosure.
Figure 11:
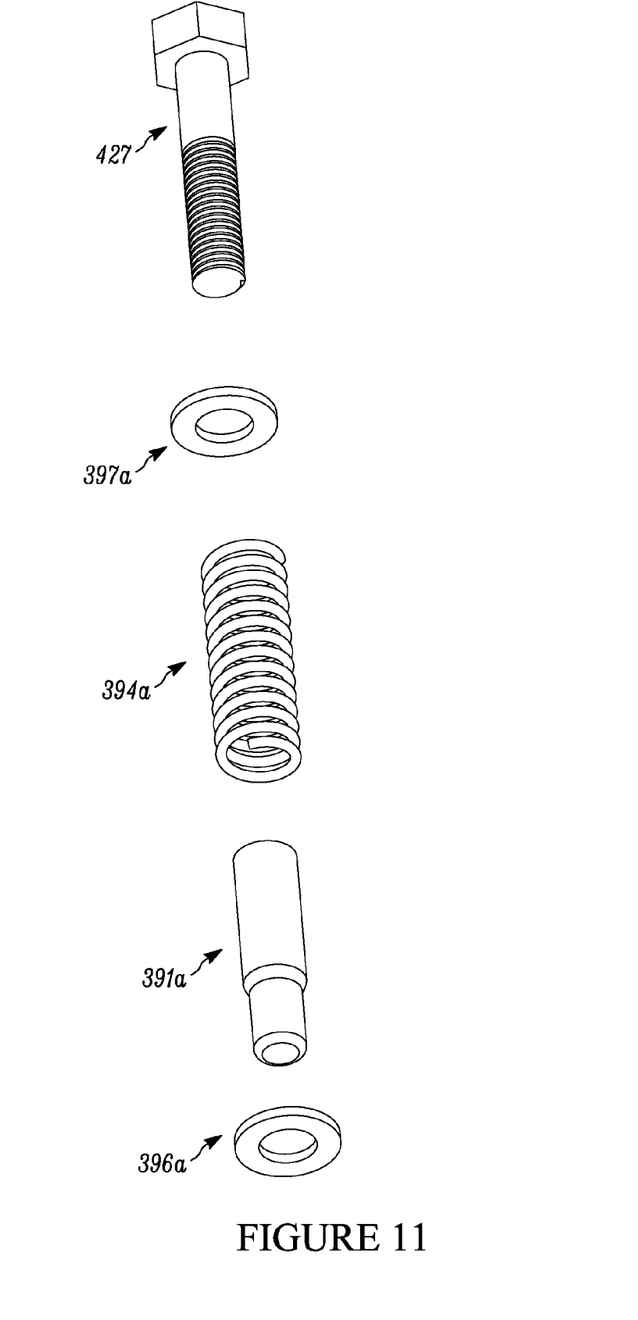
FIG. 11 of the drawings is an exploded view of the suspension assembly of the container retaining system of the present disclosure.
Figure 12:
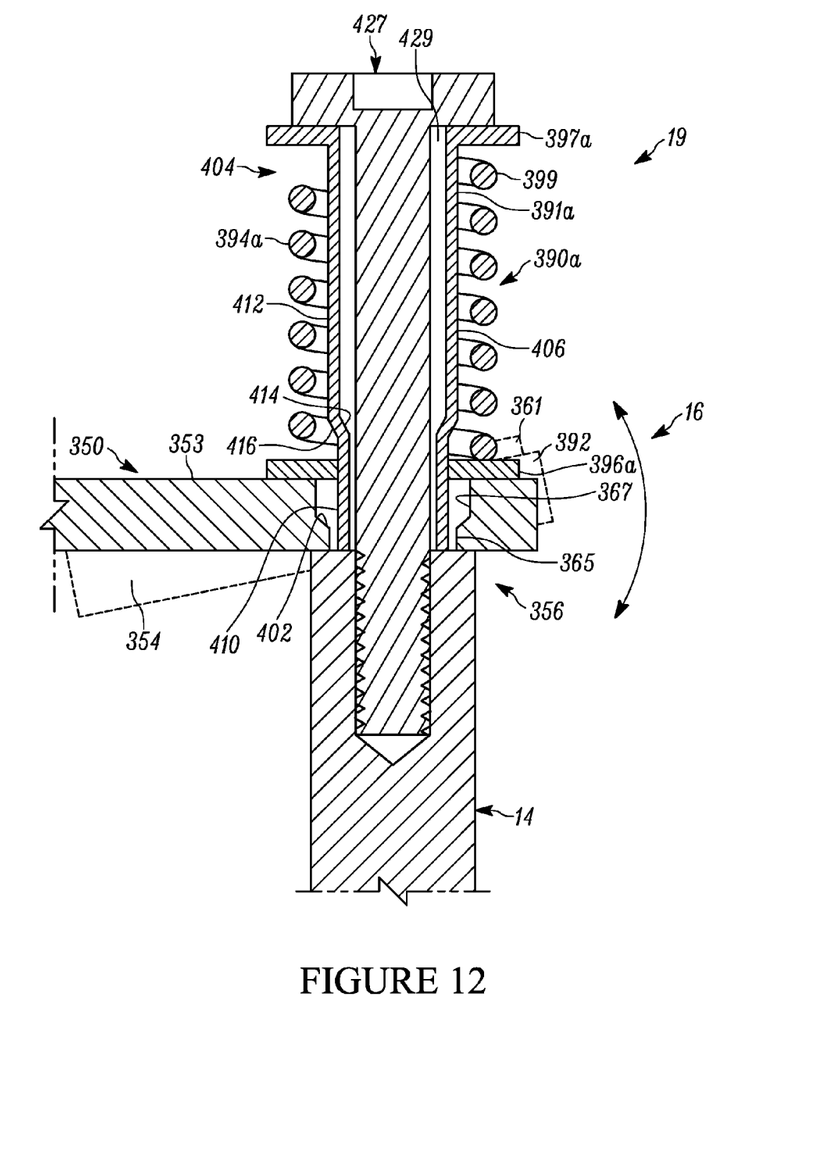
FIG. 12 of the drawings is a partial cross-sectional view of the configuration of the container retaining system of the present disclosure.

In another configuration of the present disclosure, shown, for example, in FIGS. 10 through 12, the principles of the present disclosure can be embodied in an alternate configuration. In such a configuration, the upper and lower plate members are replaced with a single plate member which has much of the function of the lower plate with respect to container retention and with respect to rotation. However, the function of the upper plate has been accomplished, in part, and for some functions through the suspension assembly as well as structures of the upstand member and the lower plate member.

In greater detail, the container retaining assembly includes plate member 350 having upper surface 353, lower surface 354, outer portion 355, and inner portion 356. The outer portion includes outer grasping surface 363. As with the lower plate described above, the outer portion and the inner portion are oblique to each other, although not required to be as such. The plate member 350 includes openings 361, 363 which extend therethrough, spaced apart from the outer grasping surface 363. The opening 361 will be described with the understanding that opening 363 is substantially similar, or identical, in configuration. Opening 361 includes lower portion 365 and upper portion 367. The two portions are concentric, and substantially circular in the configuration shown. Of course, other configurations, such as oval configurations (or square, pentagonal, or having another shape). The lower portion 365 has a diameter greater than the upper portion 367. In the configuration shown, a flange or chamfer is positioned at the interface between the lower portion 365 and the upper portion 367.

In such a configuration, the suspension assembly 19 includes first strut assembly 390a and second strut assembly 30b. The two struts, as can be seen extend from the upstand portion 14 and controllably couple and limit the movement of the plate member 350 relative to the upstand portion 14. The first strut assembly 390a will be described with the understanding that it is substantially identical in configuration to the second strut assembly 390b.

The strut assembly 390a includes strut tower 391a and biasing member 394a. The strut tower 391a includes first end 402 and second end 404. In the configuration shown, the strut tower extends upwardly from the end of the upstand portion. The strut tower, in the configuration shown is coupled to the upstand portion through fastener 427 which extends through a corresponding bore within the strut tower, the fastener includes a head which cooperates with the second end 404 (and in the embodiment shown, with a washer 398a). The strut tower further includes an outer surface 406 which generally forms a substantially cylindrical with a first portion 410 and a second portion 412 which are of varying diameter. An axial flange 414 extends between the first portion 410 an the second portion 412. The axial flange meets the second portion 412 at an outer edge or surface 416. In the configuration shown, the first portion is concentric with the second portion and the bore, and defines a diameter that is smaller than the second portion.

The biasing member 394 includes a first end 398a and a second end 399a. The biasing member extends over the strut tower (although variations are contemplated. As is shown in the Figures, the first end 398a of the biasing member 394a applies a force against the upper surface 353 of the plate member 350 (in the configuration shown, through a lower washer 397a) such that the washer forms the lower end of the biased member. The second end 399a is directed against the washer 396a proximate the head of the fastener 427, thus, forming the upper end of the biased member.

It will be understood that the biasing member essentially directs the lower surface 354 against the upper end of the upstand portion so as to maintain the plate member 350 in a first resting orientation. In such an orientation, the lower surface extends across the upstand portion, and the biasing means has reached the end of travel (or, from another vantage point, the plate member has reached the end of travel). Such a resting orientation has the planar surfaces in overlying engagement (or overlying position where a washer or the like, or a wear surface, is positioned therebetween).

As the user displaces the outer portion 355 of the plate member in either one of an upward or downward direction, the movement overcomes the biasing force of the biasing member, and directs the biasing member to contract. In the example of the movement of the outer portion in the downward direction, the plate member 350 rotates about the inner edge of the upstand portion, with the part of the plate on the opposite side of the inner edge from the outer portion extending in an upward direction. Continued downward displacement of the outer portion of the plate member eventually directs the openings 361, 363 to be directed into contact with the outer surface of the strut tower (or the corresponding washer 397b) to hit against the strut tower, thereby stopping further rotative movement of the plate member relative to the upstand portion and the strut tower. In general, the amount of rotation is limited, in part, by the relative size of the openings of the plate member, the thickness of the plate member, and the size of the washer and the strut tower. In the configuration shown, eventually, the washer 397a is directed by the upper surface of the plate member into contact with the outer edge (or surface) 416 of the outer surface of the strut tower. Due to the configuration of the first and second portion of the outer surface of the strut assembly minimize the wear on the strut assembly and provide a positive stop for the continued rotation of the plate member relative to the strut tower. In such a configuration, the plate member has reached the deflected orientation.

It will be understood that due to the placement of the biasing member, the biasing member, upon the elimination of the force upon the plate member, will return the plate member to the initial resting orientation. Due to the relatively flat configuration of the plate member proximate the biasing member, and the generally flat configuration of the upper end of the upstand portion, the biasing member generally acts upon the plate member all the way around the strut tower and, as such, maintains the plate member and the upper end of the upstand member in engagement along the surface thereof.

It will be understood that the biasing member may be positioned below the plate member, so as to interface with the lower surface of the plate member. Such a configuration would take in part the configuration shown in FIG. 1. It will be additionally understood that the features of the height adjustment of the upstand portion are equally applicable to the configuration shown.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A container retaining system for a filler comprising:
   an upstand portion extending in a generally upward direction from a surface upon which containers are positioned for filling;
   a container retaining assembly coupled to the upstand portion, the container retaining assembly including:
      a plate member having an upper surface and a lower surface, at least one opening extends through the plate member which is spaced apart from an outer portion extending outwardly sufficient so as to be capable of interfacing with a filler valve of a filler; and
   a suspension assembly including at least one strut tower, the strut tower extending through the at least one opening of the plate member, and a biasing member biasing the plate member relative to the strut tower and the upstand portion in a first resting orientation, whereupon overcoming the biasing member rotates the plate member relative to the upstand portion and the at least one strut tower, and wherein the plate member is configured to pivot relative to the strut tower into a deflected orientation.

2. The container retaining system of claim 1 wherein in the first resting orientation the biasing member is directed into the upstand portion and into overlying placement relative thereto, and wherein in the deflected orientation, the plate member is rotated about the upstand portion, with the strut tower defining a stop, precluding further rotation.

3. The container retaining system of claim 2 wherein the strut tower comprises a substantially cylindrical configuration and includes a first portion and a second portion, the first and second portions being concentric with the first portion having a diameter smaller than the second portion, and with an axial flange extending therebetween, the axial flange including at least one of an outer edge and an outer surface, in turn, defining the stop.

4. The container retaining system of claim 1 wherein the biasing member is a spring that encircles the strut tower.

5. The container retaining system of claim 4 wherein the spring encircles the at least one opening of the plate member in the resting orientation.

6. The container retaining system of claim 1 wherein the outer portion of the plate member is oblique relative to an inner portion of the plate member.

7. The container retaining system of claim 1 wherein the strut tower includes a bore extending therethrough, with a fastener extending through the bore and into the upstand member, the fastener coupling the strut tower to the upstand member.

8. The container retaining system of claim 7 wherein a washer is positioned between a head of the fastener and the strut tower, with the washer defining a first end biasing member retaining structure, with the first end of the biasing member abutting the washer.

9. The container retaining system of claim 8 wherein a second washer is positioned to overlie the upper surface of the plate member and to encircle the at least one opening, the second washer defining a second end biasing member retaining structure, with the second end of the biasing member abutting the washer.

* * * * *